US010242206B2

(12) United States Patent
Abraham et al.

(10) Patent No.: US 10,242,206 B2
(45) Date of Patent: Mar. 26, 2019

(54) SYSTEM AND METHOD FOR FAST PROBABILISTIC QUERYING ROLE-BASED ACCESS CONTROL SYSTEMS

(71) Applicant: Onapsis, Inc., Boston, MA (US)

(72) Inventors: Sergio Abraham, Ciudad Autonoma de Buenos Aires (AR); Fernando Russ, Ciudad Autonoma de Buenos Aires (AR)

(73) Assignee: Onapsis, Inc., Boston, MA (US)

( * ) Notice: Subject to any disclaimer, the term of this patent is extended or adjusted under 35 U.S.C. 154(b) by 251 days.

(21) Appl. No.: 15/254,136

(22) Filed: Sep. 1, 2016

(65) Prior Publication Data

US 2018/0060593 A1 Mar. 1, 2018

(51) Int. Cl.

| | |
|---|---|
| ***G06F 21/00*** | (2013.01) |
| ***G06F 21/60*** | (2013.01) |
| ***G06F 17/30*** | (2006.01) |
| ***G06F 21/62*** | (2013.01) |
| ***H04L 29/06*** | (2006.01) |
| ***H04W 12/08*** | (2009.01) |

(52) U.S. Cl.

CPC ........ *G06F 21/604* (2013.01); *G06F 17/3033* (2013.01); *G06F 17/30867* (2013.01); *G06F 21/6218* (2013.01); *G06F 21/6227* (2013.01); *H04L 63/10* (2013.01); *H04W 12/08* (2013.01)

(58) Field of Classification Search

None

See application file for complete search history.

(56) References Cited

U.S. PATENT DOCUMENTS 8,316,237 B1 * 11/2012 Felsher ................. H04L 9/0825 380/282
8,499,355 B1 * 7/2013 Goncharov ............. G06F 21/44 726/25

(Continued)

OTHER PUBLICATIONS

Zargar, Saman Taghavi et al. A Survey of Defense Mechanisms Against Distributed Denial of Service (DDoS) Flooding Attacks. IEEE Communications Surveys&Tutorials, vol. 15, Issue: 4. https://ieeexplore.ieee.org/stamp/stamp.jsp?tp=&arnumber=6489876 (Year: 2013).*

(Continued)

*Primary Examiner* — Jeremiah L Avery

(74) *Attorney, Agent, or Firm* — Peter A. Nieves; Sheehan Phinney Bass & Green PA

(57) ABSTRACT

A method includes extracting from a computer-based system, (e.g., a role-based access control system) information identifying users and information identifying one or more profiles for each of the users, creating one computer-based user bloom filter for each one of the users, creating one computer-based profile bloom filter for each one of the profiles and creating one action bloom filter for each of a plurality of possible end user queries. Each profile corresponds to one or more assigned authorizations, each user bloom filter correlates an associated one of the users to one or more of the assigned profiles, each profile bloom filter correlates an associated one of the profiles to one or more of the assigned authorizations, and each action bloom filter correlates an associated one of the possible end user queries to a set of users that are authorized to perform the action associated with the corresponding end user query.

14 Claims, 11 Drawing Sheets

102

Initialization

Extract, from RBAC, user information and profile (e.g., authorization) information about each user — 342

Create one computer-based user bloom filter for each user — 344

Create one computer-based profile bloom filter for each profile — 346

Create one computer-based action bloom filter for each of multiple possible end-user queries — 348

(56) References Cited

U.S. PATENT DOCUMENTS

| | | | | |
|---|---|---|---|---|
| 8,780,635 | B2* | 7/2014 | Li | G11C 16/08 365/185.17 |
| 8,955,115 | B2 | 2/2015 | Sabetta et al. | |
| 9,654,478 | B2* | 5/2017 | Stolfo | H04L 63/145 |
| 9,723,044 | B1* | 8/2017 | Kosslyn | G06F 17/30041 |
| 2006/0074739 | A1 | 4/2006 | King et al. | |
| 2007/0288253 | A1 | 12/2007 | Cobb et al. | |
| 2008/0176583 | A1* | 7/2008 | Brachet | G01S 5/0236 455/456.3 |
| 2010/0235495 | A1* | 9/2010 | Petersen | H04L 63/1458 709/224 |
| 2012/0246301 | A1* | 9/2012 | Vyrros | H04L 45/745 709/224 |
| 2012/0311329 | A1* | 12/2012 | Medina | H04L 12/581 713/168 |
| 2012/0311686 | A1* | 12/2012 | Medina | H04L 63/0807 726/7 |
| 2013/0151849 | A1 | 6/2013 | Graham et al. | |
| 2013/0244614 | A1* | 9/2013 | Santamaria | H04L 51/04 455/411 |
| 2015/0220625 | A1* | 8/2015 | Cartmell | H04M 3/2281 707/754 |
| 2016/0006739 | A1* | 1/2016 | Huang | H04L 63/101 726/5 |
| 2017/0004179 | A1* | 1/2017 | Sang | G06F 17/30528 |

OTHER PUBLICATIONS

Trabelsi, Slim et al. Context-Aware Security Policy for the Service Discovery. 21st International Conference on Advanced Information Networking and Applications Workshops (AINAW'07). https://ieeexplore.ieee.org/stamp/stamp.jsp?tp=&arnumber=4221104 (Year: 2007).*

Tripunitara, et al, Efficient Access Enforcement in Distributed Role-Based Access Control (RBAC) Deployments; SACMAT 2009, Italy.

Frias-Martinez, et al; "Behavior-Based Network Access Control: A Proof-of-Concept"; Sep. 15, 2008, pp. 176-177, 182-186.

European Search Report for application No. EP 17001450, dated Nov. 2, 2017.

Symmetry Risk Analyzer Product Description, available online: http://symmetrycorp.com/it-solutions/controlpanelgrc-sap-governance-risk-and-compliance/sap-grc-risk-analysis/[Jul. 14, 2016 2:11:26 PM].

Oracle Corporation: Oracle Advanced Controls, Oracle Data Sheet, Oracle Application Access Controls Governor (AACG)—for E-Business Suite; online as of Jul. 1, 2016.

Infor; Product Overview for Infor Approve Continuous Monitoring; available online; http://www.infor.com/product-summary/efm/approva-continuous-monitoring/[Jul. 14, 2016 2:12:24 PM].

SAP; SAP Access Control and Governance; available online: http://go.sap.com/product/analytics/access-control.html [Jul. 14, 2016 2:13:18 PM].

SAP Note 1580877—Best Practices in Storage Management for SoD Analysis Jobs, Version 7, Validity Mar. 29, 2016.

Martin Plummer; Safeguard Your Business—Critical Data with Real-Time Detection and Analysis; SAPInsider Oct.-Dec. 2014 issue.

SAP SE; SAP Enterprise Threat Detection presentation; Oct. 15, 2014.

SAP SE; SAP Solution Brief; Protect Your Connected Business Systems by Identifying and Analyzing Threats; 2014.

* cited by examiner 862
866
882
898
868
870
874
876
878
880
884
890
801
886
896
803
888
892
805
894
872

SYSTEM AND METHOD FOR FAST PROBABILISTIC QUERYING ROLE-BASED ACCESS CONTROL SYSTEMS

FIELD OF THE INVENTION

This disclosure relates to role-based access control (RBAC) and, more particularly relates to methods and systems for facilitating fast querying computer-based RBAC systems controlling the rate of false positive results while suppressing any false negative result.

BACKGROUND

Role-based access control (RBAC) involves regulating access to computer or network resources based on roles of individual users within a particular enterprise. In this context, access generally is the ability of an individual user to perform specific tasks, such as viewing, creating, or modifying a file. Roles may be defined according to job competency, authority, and/or responsibility within the enterprise.

The popularity of RBAC, particularly in connection with large enterprises, is evident from the fact that the largest businesses use it.

SUMMARY OF THE INVENTION

In one aspect, a method includes extracting from a computer-based, role-based access control system information identifying users and information identifying one or more profiles for each of the users, creating one computer-based user bloom filter for each one of the users, creating one computer-based profile bloom filter for each one of the profiles, and creating one action bloom filter for each of a plurality of possible end user queries. Each profile corresponds to one or more assigned authorizations, each user bloom filter correlates an associated one of the users to one or more of the assigned profiles, each profile bloom filter correlates an associated one of the profiles to one or more of the assigned authorizations, and each action bloom filter correlates an associated one of the possible end user queries to a set of users that are authorized to perform the action associated with the corresponding end user query.

In another aspect, a computer-based method includes initializing a query system for a computer-based, role-based access control (RBAC) system by: 1) extracting from the RBAC system information identifying a plurality of users and information identifying one or more profiles for each respective one of the users, where each profile corresponds to one or more assigned authorizations, and 2) creating a plurality of different types of computer-based bloom filters based on the extracted information. The method further includes monitoring the computer-based RBAC system for changes and updating one or more of the bloom filters according to one or more changes to the computer-based RBAC system.

In some implementations, one or more of the following advantages are present.

Querying of RBAC systems can be performed much more quickly than previously possible. The approach is relatively simple and elegant and avoids the possibility of false negatives.

Other features and advantages will be apparent from the description and drawings, and from the claims.

DETAILED DESCRIPTION

Figure 1:
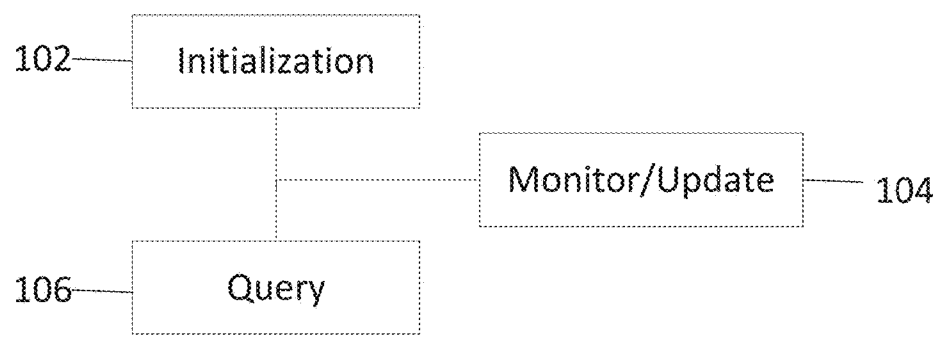
FIG. 1 is a flowchart showing a high-level overview representing system initialization, updating and querying functionalities.

FIG. 1 is a flowchart representing a process for setting up and running a fast, high V accurate and relatively simple query system for a computer-based, role-based access control (RBAC) system.

In general, an RBAC system is a computer system for restricting access to certain parts of a computer system or network to authorized users only. RBAC systems are widely used, particularly by enterprises that have a large number of employees (e.g., 500 employees or more).

According to the illustrated flowchart, the process includes (at 102) initializing the query system, which generally happens at start up. In a typical implementation, initialization includes extracting information from an RBAC system and using that information to create a plurality of bloom filters that facilitate subsequent querying and query management.

The information extracted from the RBAC system can include a variety of different types of information. However, typically, the information includes at least a list of users and their respective profile information including, for example, one or more assigned authorizations (i.e., privileges, functions, relationships, constraints, etc.) per user. In one, more particular example, the extracted information might include a list of the employee names (and/or unique identification codes for each employee) and the profile information for each user might include an identification as to which of the listed employees are authorized to set up new vendor records in the enterprise's databases and which of the listed employees are authorized to generate purchase orders on behalf of the enterprise.

If, in a particular enterprise, one person happens to be able to (i.e., authorized to) set up a new vendor record in the enterprise's database and able to (i.e., authorized to) generate purchase orders on behalf of the enterprise, this could be a problem. More particularly, the dual authorizations in this example creates a risk that that one person might abuse his or her power (e.g., by creating a new vendor record for a fictional vendor, generating a fraudulent purchase order for that fictional vendor and then taking the resulting payment for his or her own benefit). This type of scenario is sometimes referred to as a segregation of duties (SoD) conflict and is generally something, of which an enterprise should be aware.

According to one view, SoD issues may be managed by splitting up a task (or sequence of tasks) so that no one task (or sequence of tasks) is handled by only one person. Instead, more than one person in an enterprise might be required to complete a task (or series of tasks). So, one possible solution to the above-referenced SoD risk, might be to change the particular person's authorizations in the RBAC so that he or she is able (i.e., authorized) to either set up new vendor records in the enterprise's database, or generate purchase orders on behalf of the enterprise, but not both. In a typical implementation, whichever privilege (e.g., authorization) is taken away from that person may be assigned to another person in the same enterprise, thereby segregating duties to different people to reduce risk of abusive or otherwise improper behavior (like fraud) or error within the enterprise.

In a typical implementation, the techniques and technologies described herein greatly facilitate identifying and/or resolving these types of SoD conflicts which due to the efficiency of the data structures supporting the present system and method, allow the implementation of near real-time systems for detection of conflicts, providing a huge value to enterprises who run these types of queries.

As mentioned above, in a typical implementation, initialization (102 in FIG. 1) includes extracting information from an RBAC system. There are a variety of ways that the data may be extracted from the RBAC system, the simplest way is directly querying the database of the RBAC system for the information related to users, profiles and authorizations for example using Structured Query Language (SQL) if the database is a relational database. Depending on the type of system, there could be different ways, like accessing to the RBAC system through HTTP, or using some proprietary protocol, e.g., RFC for SAP Systems.

In a typical implementation, the extracted information may be stored in a computer-based memory storage system and may be used to create the plurality of bloom filters that ultimately, as discussed herein in further detail, help facilitate query management.

In general terms, a bloom filter includes a space-efficient probabilistic data structure stored in a computer-based memory storage device that can be used to test whether an element is a member of a set. More particularly, in a typical implementation, one bloom filter is represented by a sequence of bits stored, for example, in a computer-based memory. When a bloom filter is created, this sequence of bits is initialized as a bit array of N bits; all N bits may be set to 0. There is a set of K different hash functions. In a typical implementation, each of those K hash functions will map some set element to one of the N array positions with a uniform random distribution.

In order to add an element to a set, i.e., a bloom filter, the element may be fed to each of the K hash functions to get K array positions. Each of those positions is set to 1 in the array. In order to query an element within a set (membership test), the element may be fed to each of the K hash functions to get K array positions. If each of those K positions is set to 1 in the array, it means the element is present in the set. Otherwise, the element is not present. As many different elements may set the same array positions, there is a small probability of false positives (that probability is handled with a certain combination of N and K). False negatives are not technically possible.

In a typical implementation, the bloom filter(s) created as part of the initialization process may be used to determine things like: 1) which employees of the enterprise are able to create new vendor records in the enterprise's databases, 2) which employees of the enterprise are able to generate purchase orders for vendors in the enterprise's database, and/or 3) whether there are any employees of the enterprise that can do both (i.e., create new vendor records and generate purchase orders). Some of the primary benefits of using a bloom filter to perform these types of queries is their very high speed, relative simplicity and the avoidance of false negatives and the controlled rate of false positives.

With bloom filters, false negatives are not possible. This is significant because, by using a bloom filter to determine which employees are able to create new vendor records in the enterprise's databases, for example, the bloom filter will not miss any employees who have that authorization.

With bloom filters false positives are possible. However, this is not expected to be a significant problem. First, the probability of producing a false positive tends to be very low for bloom filters and can be controlled and reduced by augmenting the bloom filter size although it cannot be equal to zero. And although adding elements to a particular set (e.g., more employees, more authorizations, etc.) tends to increase the probability of a false positive, the probability of a false positive still will be rather low-so low, in fact, that most end users of the technology will consider the occurrence of any false positives to be completely acceptable from a practicability perspective.

Moreover, even if a bloom filter produces a false positive (e.g., by identifying employee, John Doe as having a particular authorization when, in fact, he does not), the practical fallout from that kind of error will, in almost every case, be negligible. This is because, in most enterprises, if a particular employee is identified as having a particular authorization, that employee would necessarily need to be involved in any kind of adjustment to their role (or authorizations) within the enterprise and when the issue was brought to him or her, he or she would simply say that the identified authorization was an error.

Meanwhile, on the other hand, the bloom filters' complete avoidance of false negatives, coupled with their very high speed and relative simplicity, is expected to be highly desirable to the system end users. In essence, it can be expected that the bloom filters will never fail to identify a member of a set that is the subject of a query. This great benefit is expected to more than offset any, very minor, inconveniences regarding the bloom filters' possibility of producing false positives.

Referring again to FIG. 1, after initialization 102, where the data is extracted from the RBAC system and used to create the bloom filters, the RBAC is monitored and the bloom filters are updated (at 104), in view of any changes that may happen in the RBAC.

In a typical implementation, the monitoring is continuous, or periodic (e.g., at regular intervals), and one or more of the bloom filters are updated whenever it has been determined that a change has occurred in the RBAC system that implicates the one or more bloom filters. This process helps ensure that the bloom filters are maintained up-to-date and accurate, in an efficient manner, so that when the bloom filters are used to respond to a query, the results produced can be justifiably relied upon.

In a typical implementation, the initializing step is performed only once for the RBAC system, whereas the monitoring step is performed on an on-going basis while the query system is in operation. Updates may happen at regular intervals (e.g., when a change has been detected).

Also, as represented in FIG. 1, after initialization, the query system is able to support end user queries (at 106).

Figure 2:
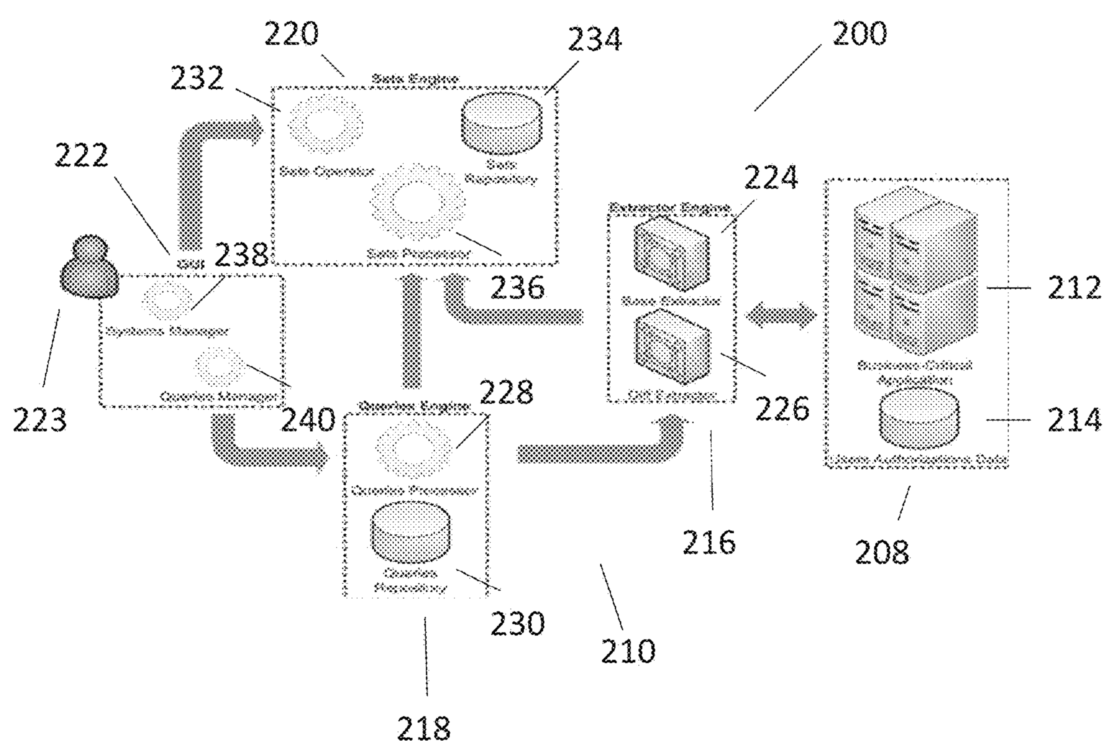
FIG. 2 is an exemplary system diagram.

FIG. 2 is a schematic diagram showing an exemplary computer system 200 that supports the query system functionalities described herein.

The illustrated system 200 includes a target system 208 and a query system 210 coupled for communication with the target system 208.

The target system 208 has servers that support one or more business-critical applications 212 and an electronic database 214 that stores information about user (employee) authorizations relative to one or more of the business-critical applications 212. Generally speaking, a business-critical application, as its name suggests, is a crucial application to keep the business running. These types of applications can vary from small tools to company-wide systems. These applications can work on clients' servers, be provided by third parties or can be developed internally. Generally speaking, these are critical applications, such that if they are interrupted, the interruption could result in big financial losses, legal losses, a bad image for the company, unhappy employees or customers, etc. A business critical application could be totally different in different companies or different industries; it basically depends on which system(s) could cause bigger damage to a company if problems occur. Exemplary business critical applications might include an enterprise resource planning (ERP) system of a retail company, a Business Intelligence system of a marketing company, or an HR system of a Human Resources Consultant. Other examples of a business critical application include an Airline reservation system or a Bank's transaction process system. The bigger examples in terms of vendors of Business Critical Applications are SAP® and Oracle® with their huge variety of products.

In a typical implementation, the target system applies role-based access control (RBAC) to the business-critical application 212. The users' authorizations database 214 stores information about the RBAC, including information about the users (employees) and each of their corresponding authorizations.

The query system 210 includes an extractor engine 216, a queries engine 218, a sets engine 220 and an end-user computer access terminal, with a graphical user interface 222, that an end-user 223 can use to interact with (e.g., submit queries to, receive results from, etc.) the query system 210 and/or the target system 208, etc. In a typical implementation, each engine in the illustrated system is embodied by computer-based hardware components (e.g., one or more computer processors, etc.) executing instructions stored in one or more non-transitory computer-readable media (e.g., computer-based memory storage devices, etc.).

The extractor engine 216 is configured to interface with the target system 208 to extract information (e.g., users, authorizations, etc. for the business-critical application 212) from the user authorizations database 214 during and subsequent to initialization. Data, or information, extraction in this regard generally refers to the acts or processes involved in retrieving data/information out of the target system 208 for further processing and/or storage at or for the query system.

The extractor engine 216 has a base extractor 224 and a difference extractor 226.

In a typical implementation, the base extractor 224 extracts information from the user authorizations database 214 during the initialization phase 102 only. Moreover, in a typical implementation, this base extraction takes place only once, when the query system 210 is being initialized.

In a typical implementation, the difference extractor 226 periodically extracts information from the user authorizations database 214 after the initialization phase 102. The end-user is in charge of defining the desired difference extraction period, based on its experience and the RBAC system. Moreover, when the difference extractor 226 extracts information, it typically only extracts whatever information has changed since the last extraction occurred. In a typical implementation, only after the extraction, the sets processor 236 will analyze which of the extracted differences are relevant for the stored bloom filters and will discard those that do not imply any change.

The information extracted, either by the base extractor 224 or the difference extractor 226, may be stored in a computer-based memory storage device or simply used to create or modify existing bloom filters.

The queries engine 218 has a queries processor 228 and a queries repository 230.

The queries processor 228 performs processing to support or perform one or more of the query functionalities disclosed herein. For example, if one wanted to query for all the users which are able to create new vendors, this query might look something like this:

select USERS from SYSTEM where (resource=VENDORS and action=CREATE)

The queries processor, in a typical implementation, is configured to understand these (and other) types of queries which may be written in their own language, giving the user the possibility of creating any kind of query combining any types of authorizations to retrieve the users which are capable of it. Typically, once the queries processor has parsed and analyzed a user query, it is stored in the queries repository and also sent to the sets engine where the results of this analysis is translated to information that can be understood as sets and elements.

Such queries are generally expressed in the form of a sentence in the relational algebra using the selection operator (sigma) with the logical operators AND, OR and NOT. It also can consist of two first order predicates: BETWEEN which allows filtering data expressed as numerical values or dates between two supplied parameters, and IN, which allows checking whether data is among a list of values. Some examples of such a query written in the Structured Query Language (a possible implementation of the relational algebra) could comprise but are not limited to:

SELECT Users from System_Authorizations WHERE (resource=VENDORS and action=CREATE): This query would bring all the users from the System_Authorizations tables who are able to create vendors.

SELECT Users from System_Aurthorizations WHERE (resource=CUSTOMERS and (action=CREATE or action=UPDATE): This query would bring all the users from the table System that are able to either create or update customers.

A repository is a collection of resources that can be accessed to retrieve information. Repositories often consist of several databases tied together by a common search engine. In the illustrated system, the queries repository 230 is a computer-based memory storage device that includes a collection of possible queries that are typically made by end users regarding the business-critical application 212 and/or the user authorizations with respect to the business-critical application 212. In a typical implementation, the queries repository 230 will be populated based on past experience and knowledge.

The sets engine 220 includes a sets operator 232, a sets repository 234 and a sets processor 236.

Translation into set operators can occur in a variety of ways. According to one implementation, the engine that performs the translation is the sets processor 236. One example of such a process is described below.

Assume three different types of data: Users, Profiles, and Authorizations.

A first extraction may be Profiles' assignments to Users. For example:

User1→Profile 1
User1→Profile 2
User2→Profile 2
User2→Profile 3
User2→Profile 5
User3→Profile 2
User3→Profile 4
User3→Profile 5
User4→Profile 1

In a typical implementation, the sets processor translates this information into sets and elements, where each user has one associated set of profiles, and the profile assignments to that user are its elements. As a result:

User1 has a set of elements: Profile 1, Profile 2
User2 has a set of elements: Profile 2, Profile 3, Profile 5
User3 has a set of elements: Profile 2, Profile 4, Profile 5
User4 has a set of elements: Profile 1

Each set of elements is created as a bloom filter and the elements are loaded.

Then, as each profile is composed by one or many authorizations, the sets processor 236 gets all the involved profiles. Following the previous example, now we have 5 profiles only: Profile 1, Profile 2, Profile 3, Profile 4, Profile 5

For each of those profiles, the base extractor 224 will extract all the relevant authorizations for that profile. For example:

Profile 1→Auth1
Profile 2→Auth 1, Auth 2, Auth 4
Profile 3→Auth 2, Auth 4
Profile 4→Auth 1, Auth 3, Auth 5
Profile 5→Auth 2

Based on that result, the sets processor 236 translates this information into sets and elements, where each profile has one associated set of authorizations, and the authorizations assignments to that profile are its elements. As result:

Profile 1 has a set of elements: Auth1
Profile 2 has a set of elements: Auth1, Auth2, Auth4
Profile 3 has a set of elements: Auth2, Auth4
Profile 4 has a set of elements: Auth1, Auth3, Auth5
Profile 5 has a set of elements: Auth2

Each set of elements is created as a bloom filter and the elements are loaded.

Then, the sets operator 232 is the one in charge of querying these bloom filters to create the Actions Bloom Filters based on the user queries.

In general, and according to a typical implementation, once the queries processor 228 has analyzed a query and sent it to the sets processor 236, the queries engine 218 analyzes if the information requested by the query is already present or if it needs to be retrieved from the RBAC system. If the information requested by the query is not present, the base extractor 224 asks for new information and then returns it to the sets processor 236, which analyzes the information coming from the RBAC system and converts it to elements and sets. Basically, in this exemplary implementation, the sets processor 236 analyses the parsed query and decides if more information is needed or not, and then translates information coming in tables to information that can be represented by sets and elements (bloom filters). The sets operator 232 is generally the component in charge of using the sets (bloom filters), querying them, asking for elements, performing intersections, updating them, and creating and/or deleting them. The sets repository 234, in a typical implementation, is simply a repository where all the sets (users bloom filters, profiles bloom filters, query bloom filters) are stored.

At the user interface 222, there is a systems manager 238 and a queries manager 240.

In a typical implementation, the systems manager 238 manages or coordinates activities of the various system components to facilitate query processing. Moreover, in a typical implementation, the queries manager 240 manages or coordinates the processing of specific queries.

There are numerous arrows depicted in the exemplary system diagram. These arrows show at least some of the ways that the illustrated system components may communicate with one another. For example, as illustrated, the user interface 222 can communicate with the sets engine 220 and with the queries engine 218. The queries engine 218 can communicate with the sets engine 220 and the extractor engine 216. Finally, the extractor engine 216 can communicate with the sets engine 220 and the target system 208. In various implementations, the illustrated system components may be adapted to communicate with each other in other ways.

In some implementations, the query system 210 in FIG. 2 may be implemented by a computer-based processor and computer-based memory (e.g., a non-transitory, computer-readable medium) that stores instructions executable by the processor to perform or facilitate the functionalities described herein as being performed by or attributable to the system.

Figure 3:
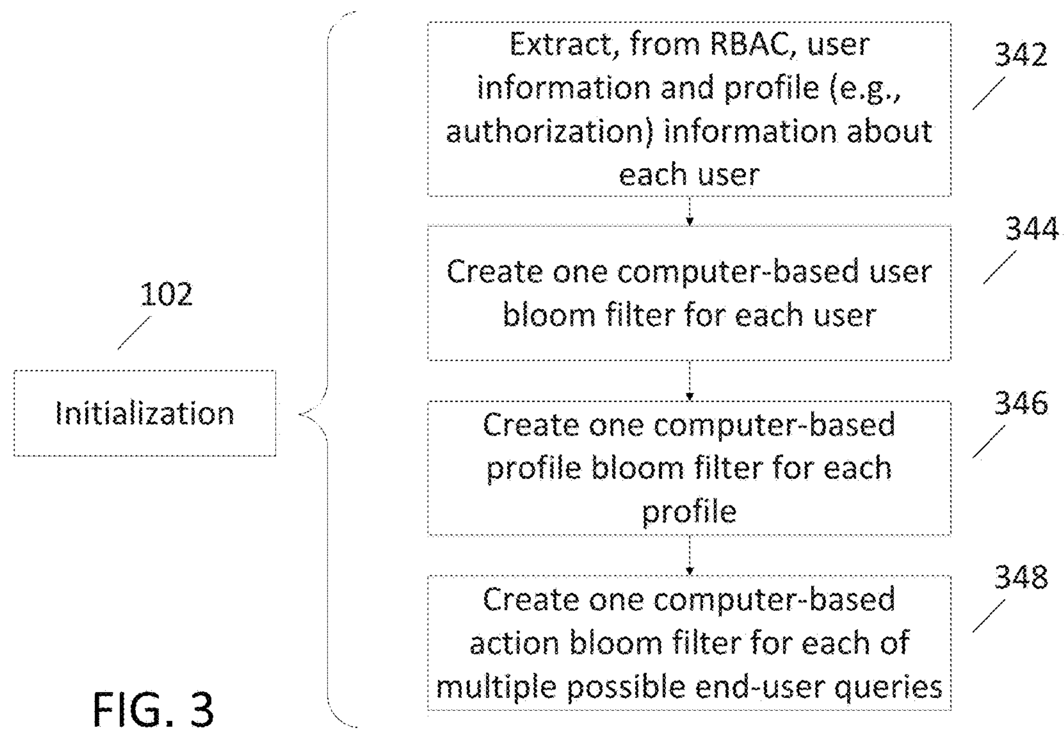
FIG. 3 is a flowchart showing an exemplary initialization process.

FIG. 3 is a flowchart of an exemplary initialization process 102. As illustrated, in the exemplary initialization process 102, the system (e.g., 210) extracts (at 342), from the RBAC system, user information and profile information about each user. In a typical implementation, the profile information about each user may include, for example, authorizations or abilities associated with each user.

Next, in the exemplary initialization process 102, the system 210 creates (at 344) one or more computer-based user bloom filters—typically, one user bloom filter per user.

Figure 7A:
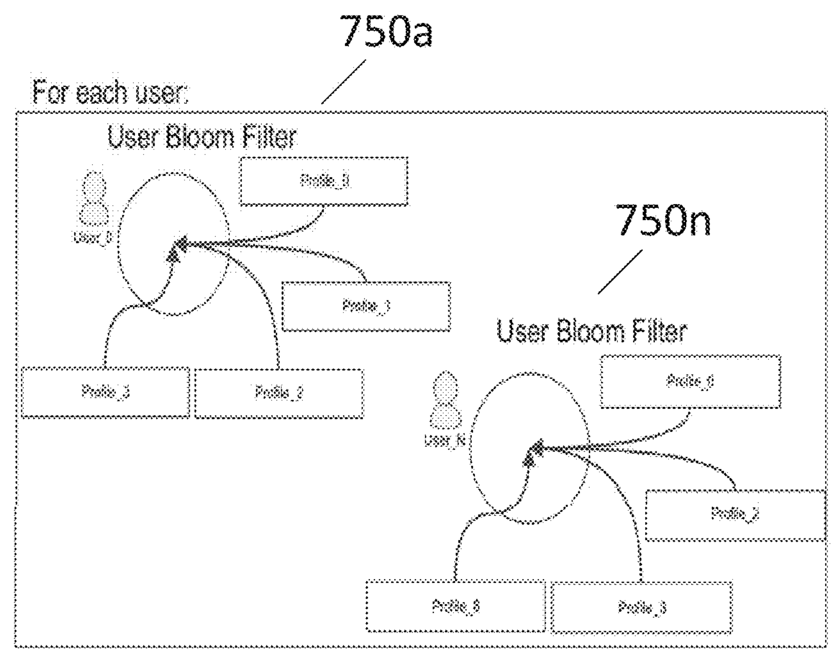
FIGS. 7A-7C are schematic diagrams representing an exemplary initialization process.

FIG. 7A is a schematic representation showing a plurality of exemplary user bloom filters 750*a* . . . 750*n*—one per user (i.e., User_0 . . . User_N) that may be created (at step 344 in FIG. 3).

In a typical implementation, each user bloom filter (e.g., 750*a* . . . 750*n*) is associated with a respective one of the users (or employees) in a particular enterprise. For example, in FIG. 7A, user bloom filter 750*a* is associated with a first user (designated User_0) and user bloom filter 750*n* is associated with a different, second user (designated User_N).

Moreover, in a typical implementation, one or more profiles will be associated with each respective one of the user bloom filters. In a typical implementation, the associated profiles represent the profiles or roles that a particular user within the enterprise has been assigned with. For example, in FIG. 7A, four profiles (Profile_0, Profile_1, Profile_2 and Profile_3) are associated with user bloom filter 750*a*. In a typical implementation, each profile corresponds to one or more authorizations that the associated user has been assigned with. Therefore, according to the example in FIG. 7A, User_0 would have been assigned the authorizations associated with each of the four corresponding profiles shown (i.e., Profile_0, Profile_1, Profile_2 and Profile_3).

In the illustrated example, a different combination of four profiles (Profile_0, Profile_2, Profile_3 and Profile_6) is associated with user bloom filter 750*n*. Therefore, according to the example in FIG. 7A, User_N would have been assigned the authorizations associated with each of the four corresponding profiles shown (i.e., Profile_0, Profile_2, Profile_3 and Profile_6).

In various implementations, a particular user (employee) may have any number of profiles (e.g., from none to many).

Referring again to FIG. 3, after creating the user bloom filters, in the exemplary initialization process 102, the system 210 creates (at 346) one or more profile bloom filters—typically,one profile bloom filter per profile.

Figure 7B:
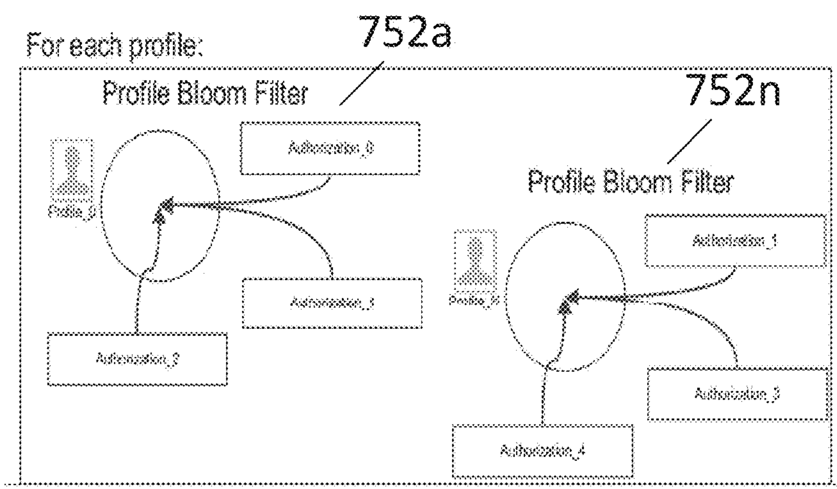

FIG. 7B is a schematic representation showing a plurality of exemplary profile bloom filters 752*a* . . . 752*n*—one per profile (i.e., Profile_0 . . . Profile_N) that may be created (at step 346 in FIG. 3).

In a typical implementation, each profile bloom filter (e.g., 752*a* . . . 752*n*) is associated with a respective one of the profiles (that have, e.g., one or more authorizations) in a particular enterprise. For example, in FIG. 7B, profile bloom filter 752*a* is associated with a first profile (designated Profile_0) and profile bloom filter 752*n* is associated with a different, second profile (designated Profile_N).

Moreover, in a typical implementation, one or more authorizations will be associated with each respective one of the profile bloom filters. In a typical implementation, the associated authorizations represent the actions within the enterprise that users having the associated profile are authorized to perform.

For example, in FIG. 7B, a set of three authorizations (Authorization_0, Authorization_1 and Authorization_2) is associated with profile bloom filter 752*a*. These are the authorizations that a user having the associated profile would have been assigned with. Therefore, according to the example in FIG. 7B, a user having the Profile_0 would have been assigned the authorizations indicated (i.e., Authorization_0 , Authorization_1 and Authorization_2). In the illustrated example, a different set of three authorizations (Authorization_1, Authorization_3 and Authorization_4) is associated with profile bloom filter 752*n*. Therefore, according to the example in FIG. 7B, a user having Profile_N would have been assigned the authorizations indicated (i.e., Authorization_1, Authorization_3 and Authorization_4).

In various implementations, a particular profile may have any number of authorizations in the enterprise (e.g., from none to many).

Referring again back to FIG. 3, finally, in the exemplary initialization process 102, the system creates (at 348) one or more action bloom filters—typically one action bloom filter per end-user query.

Figure 7C:
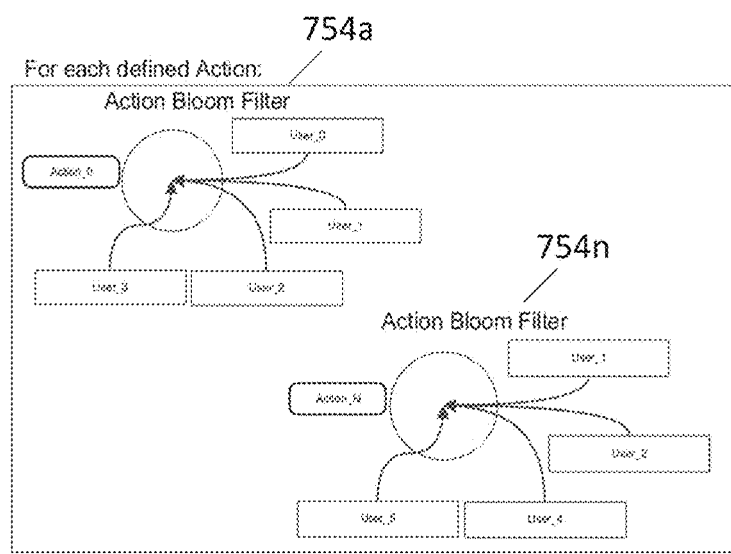

FIG. 7C is a schematic representation showing a plurality of exemplary action bloom filters 754*a* . . . 754*n*—one per action (i.e., Action_0 . . . Action_N) that may be created (at step 348 in FIG. 3).

In a typical implementation, each action bloom filter (e.g., 754*a* . . . 754*n*) is associated with a respective one of the actions (e.g., setting up new vendor records in the enterprise's databases or generating purchase orders on behalf of the enterprise) that one or more users in the enterprise may be authorized to perform. For example, in FIG. 7C, action bloom filter 754*a* is associated with a first action (designated Action_0) and action bloom filter 754*n* is associated with a different, second action (designated Action_N).

Moreover, in a typical implementation, and as shown in FIG. 7C, one or more users will be associated with each respective one of the action bloom filters. The associated users are those who are authorized within the enterprise to perform the associate action.

For example, in FIG. 7C, a set of four users (User_0, User_1, User_2 and User_3) is associated with action bloom filter 754*a*. These are the users that are authorized within the enterprise to perform the action associated with that action bloom filter. Therefore, according to the example in FIG. 7C, users User_0, User_1, User_2 and User_3 would be authorized to perform the action corresponding to Action_0.

In the illustrated example, a different set of four users (User_1, User_2, User_4 and User_5) is associated with action bloom filter 754*n*. Therefore, according to the example in FIG. 7C, these users (User_1, User_2, User_4 and User_5) would be authorized to perform the corresponding action.

In various implementations, a particular action may have any number of users authorized to perform it within an enterprise (e.g., from none to many).

Figure 4:
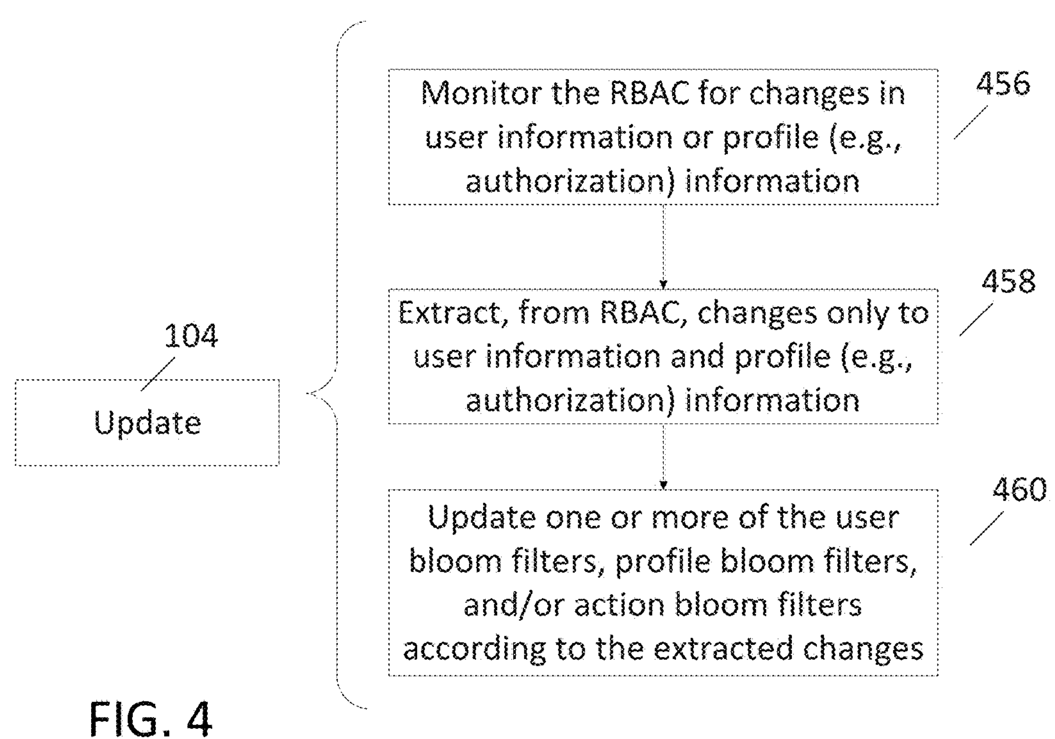
FIG. 4 is a flowchart showing an exemplary updating process.

After initialization, the system enters a monitoring/updating mode 104, an example of which is shown in FIG. 4, during which the system: 1) monitors at 456) the RBAC system for changes, 2) extracts (at 458), from the RBAC system, any changes, and 3) updates (at 460) one or more of the user bloom filters in accordance with the extracted data. In some implementations, the system disclosed herein may require a notification of a change to occur.

Figure 8:
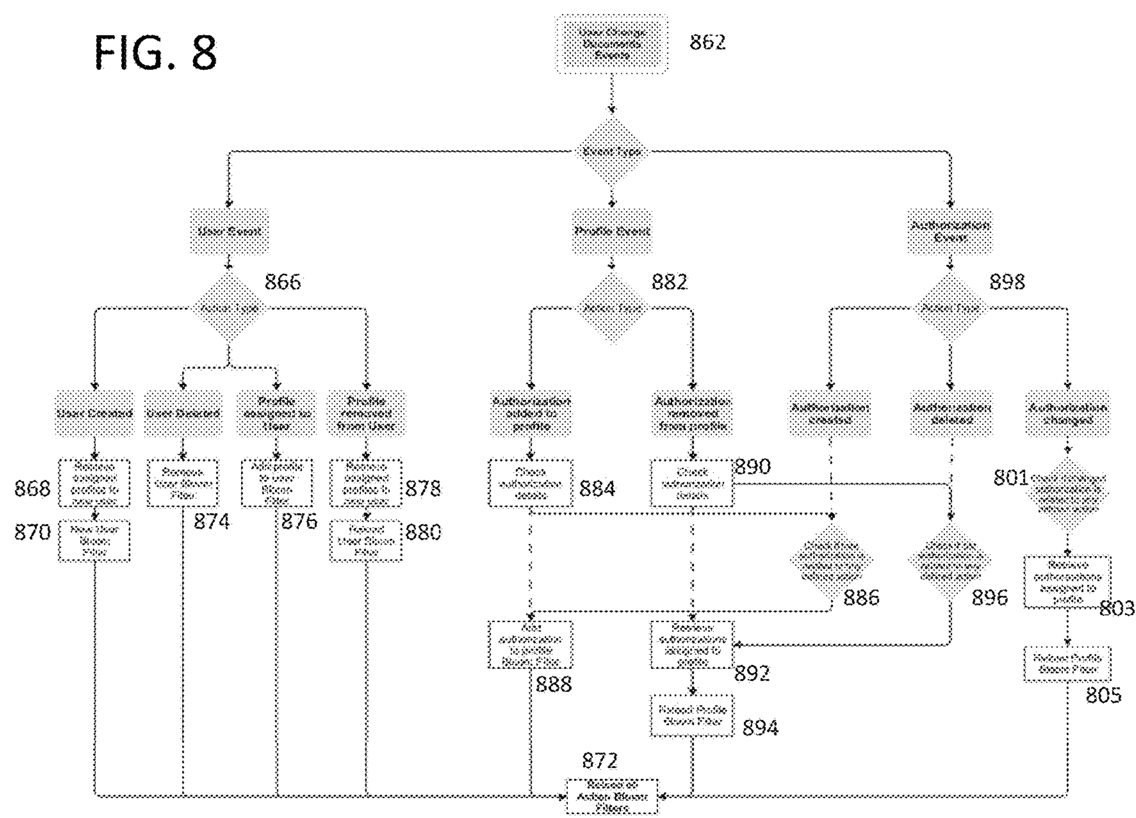
FIG. 8 is a detailed flowchart showing an exemplary updating process.

FIG. 8 shows an exemplary implementation of how a system (e.g., 200) might behave in monitoring/update mode, when there is a change made (at 862) in the associated RBAC system.

According to the illustrated example, upon receiving a User Change Documents event (at 862), the system analyzes the information based on the received data, if it was the creation or deletion of a user, or a new role/profile assignment or removal from a user, then this is a user event. If it was an assignment or removal of an authorization to/from a role/profile then this is a profile event. If a new authorization was created, deleted or changed, then this is an authorization event.

According to the illustrated implementation, if the system 200 determines (at 862) that the event type is a user event, the system then (at 866) determines the action type. More particularly, the system (at 866) determines whether a user has been created or deleted, whether a new profile has assigned to an existing user, or whether a profile has been removed from an existing user.

If the system (at 866) determines that a new user has been created, then the system (at 868) retrieves the profiles that have been assigned to the new user, and (at 870) creates a new user bloom filter. The system then (at 872) reloads all action bloom filters. Generally speaking, in some implementations, bloom filters act as sets which can be loaded but (for their composition) cannot be unloaded unless an enhanced design of bloom filters is implemented. This means that with a typical implementation of bloom filters, if an element needs to be removed from the bloom filter, the whole set of elements generally needs to be rebuilt again. It is important to remark that those implementations where deletion is supported in the bloom filters don't affect the structure's performance in adding, querying or deleting elements from the bloom filter. We proceed describing the method taking into consideration a typical bloom filter.

If the system (at 866) determines that a user has been deleted, the system (at 874) removes the associated user bloom filter and then (at 872) reloads all action bloom filters.

If the system (at 866) determines that a profile has been added to an existing user, then the system (at 876) adds the profile to the corresponding user bloom filter and then (at 872) reloads all action bloom filters.

If the system (at 866) determines that a profile has been removed from a particular user, as elements cannot be removed in typical bloom filters, the system (at 878) reloads (at 880) the user bloom filter with the current assigned profiles and then (at 872) reloads all action bloom filters.

If the system (at 862) determines that the event is a profile event, then the system (at 882) determines what type of action has taken place. The possible types of action shown in the illustrated example include: an authorization being added to a profile, and an authorization being removed from a profile.

If the system (at 882) determines that the profile event involved adding an authorization to a profile, the system 884) checks the authorization details and then either adds the authorization to the corresponding profile bloom filter (at 888) or checks (at 886) if the new authorization is related to any defined action and then adds the authorization to the corresponding profile bloom filter (at 888). The system then (at 872) reloads all action bloom filters.

In a typical implementation, regardless if an authorization is being added or removed, the system may need to validate if that authorization was being used already by any query. This can be an important point. Because here is where the system may have the ability to understand if it needs to process information or not and save time and computing resources, if possible. If, for example, there is only one query, essentially the same as one of the examples above:

select USERS from SYSTEM where (resource=VENDORS and action=CREATE)

There are two authorizations in this example:

Resource=VENDORS

Action=CREATE

In general, the update process would detect ANY changes in profiles and authorizations in the RBAC system, so the update process would detect that a new profile has received the authorization Resource=VENDORS, then the system is going to add this authorization to the corresponding profile bloom filter (positive case).

Now imagine that the update process detects that a new profile has received the authorization Resource=CUSTOMERS, then the system is going to discard this event since it is not being used by any queries and nothing is going to change in the bloom filters (negative case).

This is how the system minimizes the information that is required to process, for example.

If the system (at 882) determines that the profile event involved removing an authorization from a profile, the system (at 890) checks authorization details and then either: 1) retrieves (at 892) the authorizations assigned to the profile, and reloads the corresponding profile bloom filter (at 894), or 2) checks if the old authorization is related to any defined action (at 896), and then retrieves (at 892) the authorizations assigned to the profile, and reloads the corresponding profile bloom filter (at 894). The system then (at 872) reloads all action bloom filters.

If the system (at 862) determines that event was an authorization event, then the system (at 898) determines the action type associated with the authorization event.

If the system (at 898) determines that an authorization has been created, then the system (at 886) checks if the new authorization is related to any defined action and then adds the authorization to the corresponding profile bloom filter (at 888). The system then (at 872) reloads all action bloom filters.

If the system (at 898) determines that an authorization has been deleted, then the system (at 896) checks if the old authorization is related to any defined action, then retrieves (at 892) the authorizations assigned to the profile, and reloads the corresponding profile bloom filter (at 894). The system then (at 872) reloads all action bloom filters.

If the system (at 898) determines that an authorization has changed, the system (at 801) checks if the changed authorization is related to any defined action, retrieves (at 803) the changed authorizations that are assigned to profiles and reloads (at 805) the profile bloom filter(s) that correspond to those profiles with the appropriate changes. The system then (at 872) reloads all action bloom filters.

Once the bloom filters are created, the system supports and facilitates queries.

Figure 5:
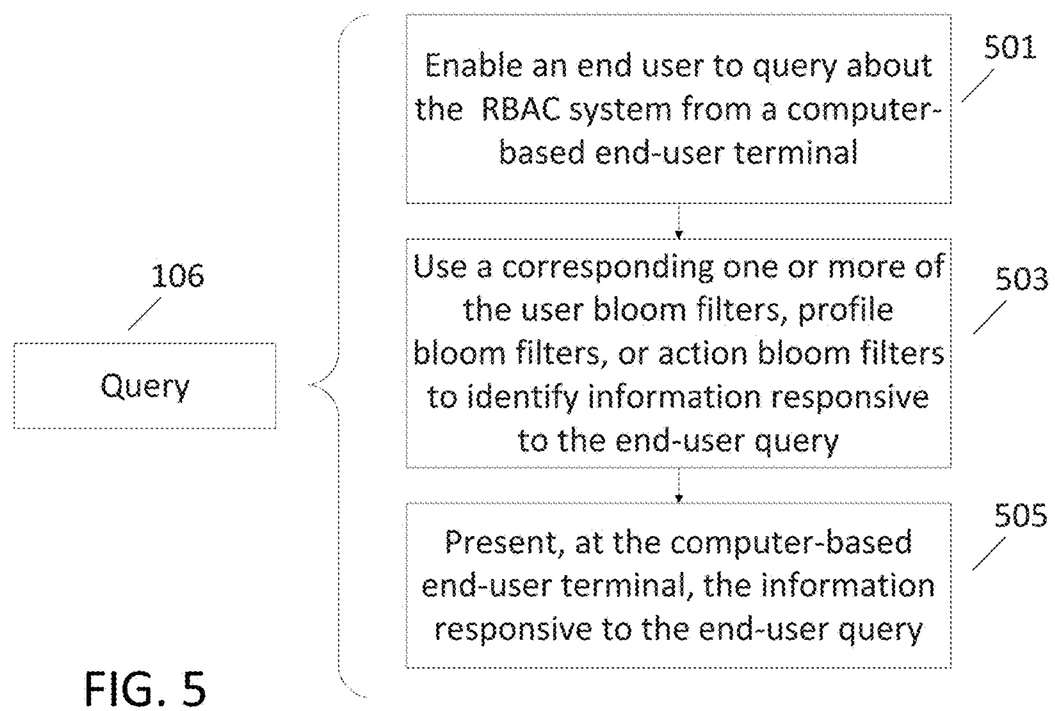
FIG. 5 is a flowchart showing an exemplary querying process.

FIG. 5 is a flowchart showing an exemplary querying (106) process. In this regard, an end user may submit a query about an RBAC system from a computer-based end-user terminal (501). If that happens, one or more of the bloom filters may be used (503) to produce a response to the query. Information responsive to the end-user query is then presented (505) at the computer-based end-user query From an end-user perspective, the action of submitting the query represents a significant improvement in terms of complexity, compared to previous technologies. The best approach to explain that difference is comparing traditional technologies and this invention in terms of Time Complexity. Time Complexity is expressed in “big O notation”, which is a standard definition.

Some traditional technologies running in live mode (i.e., extracting and processing current live information from a system) and supported by relational databases present a performance which is as good as the cost of querying by the database management system, which depends on the implementation of joining algorithms and the indices created for each queried table used by those algorithms. Usually these costs are of linear complexity in the number of tuples or over the amount of related tuples. Briefly explained, checking whether an element belongs to a table, depends on the amount of elements in the table, and when checking for relations in a relational database, they depend on the amount of related elements.

On the other hand, certain implementations of the concepts disclosed herein involve querying bloom filters where checking if an element belongs to a set (a set representing a table in the relational database example) is of constant (or $O(1)$) cost regardless of the amount of elements in the set. Moreover, operations between sets such as intersections or unions, which in a relational database would be implemented as joins between tables, are also of constant cost regardless how many elements they hold.

Comparing both complexities, we observe that the processing complexity, in certain implementations of the concepts disclosed herein is on a considerably lower order, which, for the end-user, can represent a huge difference in terms of response-time.

Figure 6:
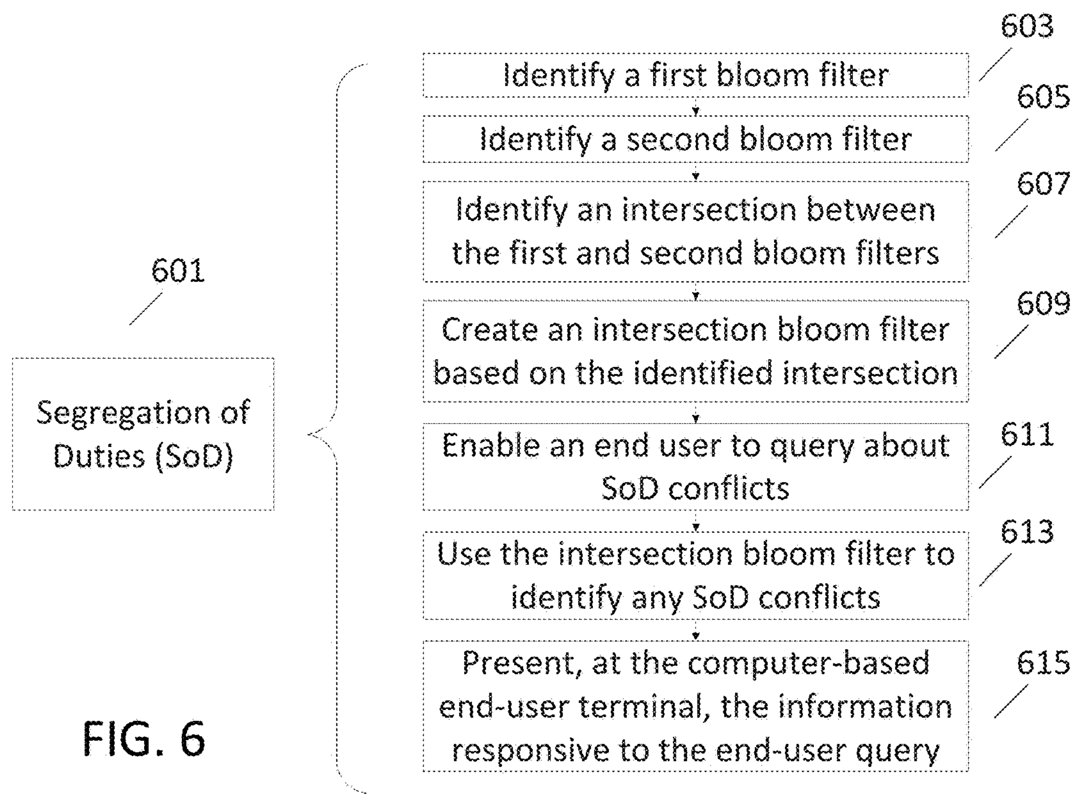
FIG. 6 is a flowchart showing an exemplary SoD conflicts querying process.

One type of query is a query to identify segregation of duties (SoD) conflicts 601, an example of which is shown in FIG. 6.

According to the illustrated example, the system, in response to a query, identifies (at 603) a first bloom filter and identifies (at 605) a second bloom filter. The system then (at 607) identifies an intersection (i.e., elements common to both) between the first and second bloom filters. The system then (at 609) creates an intersection bloom filter based on the identified intersection. In some implementations, these steps may be performed during initiation. In a typical implementation, if intersection bloom filters are created upon initiation, they generally should be updated during monitoring.

Actually, in a typical implementation, every received event that triggers a change on the bloom filters will trigger an update on the action bloom filters, and as consequence, that will trigger an update on the intersection bloom filter too. Moreover, in some implementations, once an SoD query is performed, it doesn't need to be re-executed; the intersection bloom filter will be updated when necessary and the SoD query will just show always the updated result.

Now, the system is able to support SoD queries using the intersection bloom filter.

Continuing along in FIG. 6, the system then (at 611) enables an end user to query about SoD conflicts and, in response to such a query, uses (at 613) the intersection bloom filter to identify any such conflicts. The system then (at 615) presents, at the computer-based end-user terminal (e.g., where the query was submitted) information responsive to the query based on results provided by the intersection bloom filter.

Figure 9:
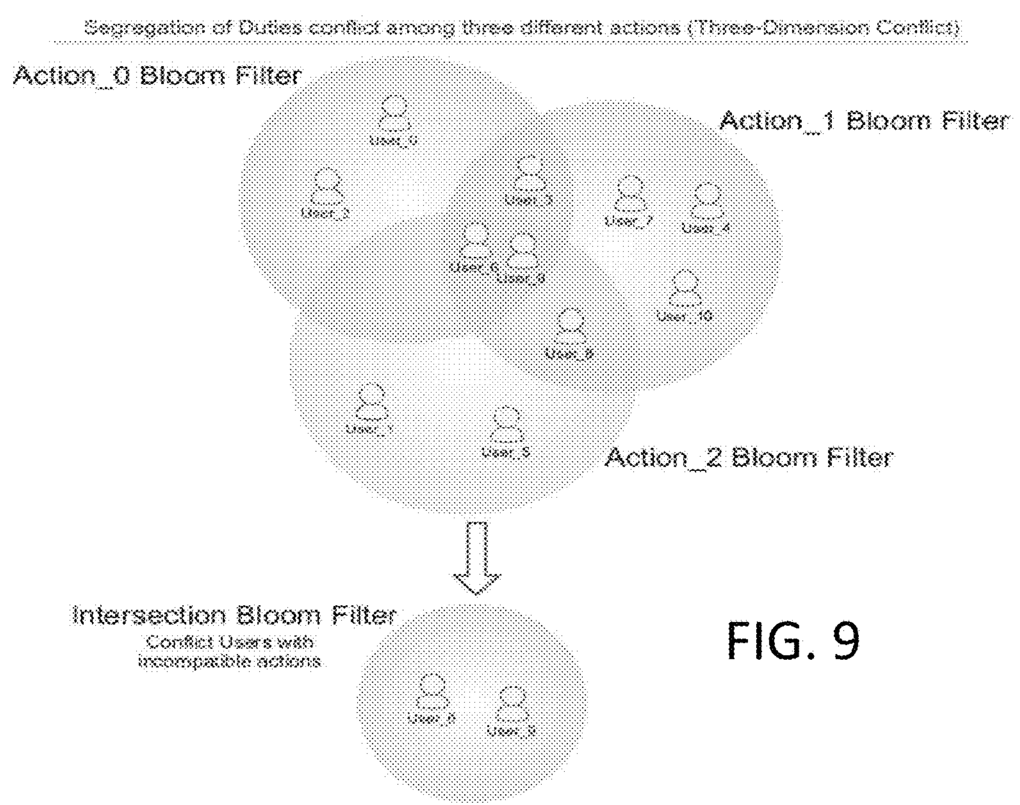
FIG. 9 is a schematic diagram representing an exemplary querying (for SoD conflicts) process

FIG. 9 is a schematic representation showing how a system (e.g., system 200) might identify a segregation of duties (SoD) conflict among three different actions (a three-dimensional conflict).

In a typical implementation, the system identifies at least a first bloom filter and a second bloom filter from among the user bloom filters, the profile bloom filters and the action bloom filters. In the illustrated example, the system identifies a first bloom filter (Action_0 bloom filter), a second bloom filter (Action_1 bloom filter) and a third bloom filter (Action_2 bloom filter).

In the illustrated example, the first bloom filter (Action_0 bloom filter) is associated with five users (User_0, User_2, User_3, User_6 and User_9). The second bloom filter (Action_1 bloom filter) is associated with seven users (User_3, User_4, User_6, User_7, User_8, User_9 and User_10). The third bloom filter (Action_2 bloom filter) is associated with five users (User_1, User_5, User_6, User_8 and User_9).

To identify possible segregation of duty conflicts (e.g., any users that can perform all of the duties associated with the first bloom filter (Action_0 bloom filter), the second bloom filter (Action_1 bloom filter) and the third bloom filter (Action_2 bloom filter)), the system, in the illustrated example, identifies an intersection between the first bloom filter, the second bloom filter and the third bloom filter.

Generally speaking, an intersection between sets is a set that contains all elements of one set that also belong to the other set (or sets, if applicable), but no other elements. In this example, the intersection between the first bloom filter, the second bloom filter and the third bloom filter is a set that includes only those users that are common to the first bloom filter, the second bloom filter and the third bloom filter. Thus, in the illustrated example, User_6 and User_9 represent the intersection of the first bloom filter, the second bloom filter and the third bloom filter.

In a typical implementation, identifying the intersection between the bloom filters may include applying only a logical AND function to the sequence of bits associated with the different bloom filters.

The system typically creates an intersection bloom filter based on the intersection.

An end-user can query for SoD conflicts from a computer-based end-user terminal, and the system uses the intersection bloom filter, in response to the query, to identify any SoD conflicts. The system then presents, at a computer-based end-user terminal, information responsive to the query from the end-user.

More generally, the computer system enables end users to query about the computer-based, role-based access control (RBAC) system from a computer-based end-user terminal and then uses a corresponding one or more of the bloom filters to identify information responsive to the end-user query. The system then presents the identified information at the computer-based end-user terminal.

Figure 10:
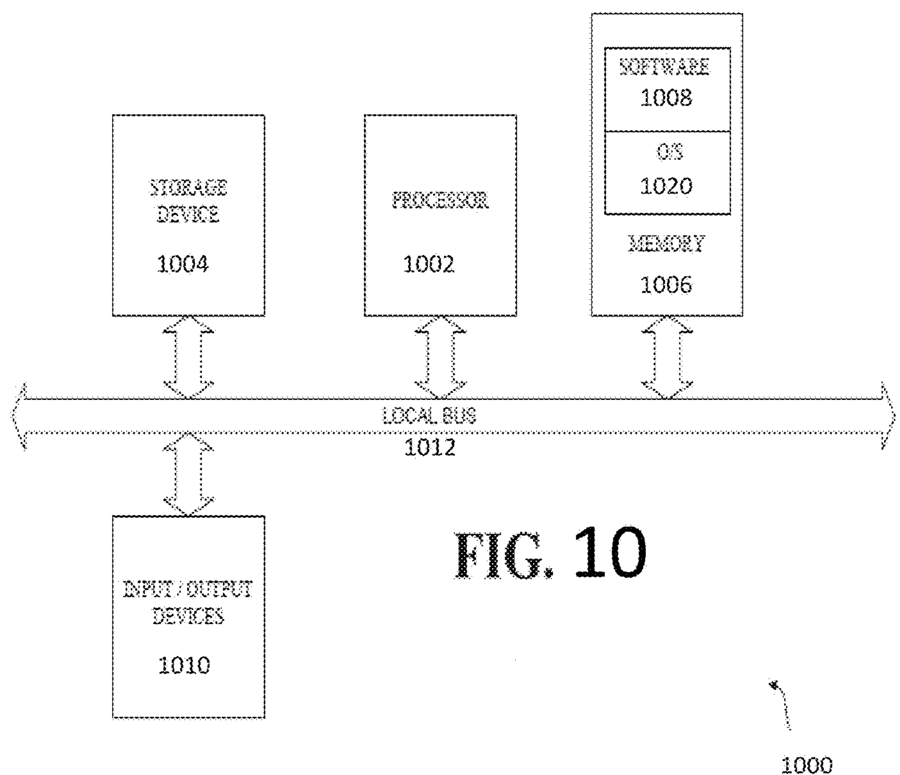
FIG. 10 is a schematic diagram of an exemplary computer-based end user access terminal.

FIG. 10 is a schematic diagram of an exemplary computer-based end user access terminal. In a typical implementation, the computer-based end user access terminals can be computers, an example of which is shown in the schematic diagram of FIG. 10. The computer 1000 contains a processor 1002, a storage device 1004, a memory 1006 having software 1008 stored therein that may, in some implementations, perform or facilitate some of the above-mentioned functionalities, input and output (I/O) devices 1010 (or peripherals), and a local bus, or local interface 1012 allowing for communication within the system 1000. The local interface 1012 can be, for example, one or more buses or other wired or wireless connections. The local interface 1012 may have additional elements, which are omitted for simplicity, such as controllers, buffers (caches), drivers, repeaters, and receivers, to facilitate communications, etc. Further, the local interface 1012 may include address, control, and/or data connections to enable appropriate communications among the aforementioned components.

In a typical implementation, the processor 1002 is a hardware device for executing software, particularly that stored in the memory 1006. The processor 1002 can be any custom made or commercially available single core or multi-core processor, a central processing unit (CPU), an auxiliary processor among several processors associated with the computer 1000, a semiconductor based microprocessor (in the form of a microchip or chip set), a macroprocessor, or generally any device for executing software instructions.

The memory 1006 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1006 may incorporate electronic, magnetic, optical, and/or other types of storage media. Note that the memory 1006 can have a distributed architecture, where various components are situated remotely from one another, but can be accessed by the processor 1002.

The software 1008 may define or facilitate one or more functionalities performed by the computer 1000. The software 1008 in the memory 1006 may include one or more separate programs, each of which contains an ordered listing of executable instructions for implementing logical functions of the computer 1000. The memory 1006 may have an operating system (O/S) 1020. The operating system may control the execution of programs within the computer 1000 and provides scheduling, input-output control, file and data management, memory management, and communication control and related services.

The I/O devices 1010 may include input devices, for example but not limited to, a keyboard, mouse, scanner, microphone, etc. Furthermore, the I/O devices 1010 may also include output devices, for example but not limited to, a display, etc., which may be connected via a USB connector, for example. Finally, the I/O devices 1010 may further include devices that communicate via both inputs and outputs, for instance but not limited to, a wireless communication system, a radio frequency (RF) or other transceiver, a telephonic interface, a bridge, a router, or other device.

When the computer 1000 is in operation, the processor 1002 is configured to execute the software 1008 stored within the memory 1006, to communicate data to and from the memory 1006, and to generally control operations of the system 1000 pursuant to the software 1008.

A number of embodiments of the invention have been described. Nevertheless, it will be understood that various modifications may be made without departing from the spirit and scope of the invention.

For example, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various embodiments, some aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors).

The operations described in this specification can be implemented as operations performed by a data processing apparatus (e.g., a processor) on data stored on one or more computer-readable storage devices or received from other sources. The term "processor," and the like, encompasses all kinds of apparatuses, devices, machines and combinations thereof (e.g., multiple apparatuses) for processing data, including by way of example a programmable processor, a computer, a system on a chip, or multiple ones, or combinations of the foregoing. The processor can include special purpose logic circuitry, e.g., an FPGA (field programmable gate array) or an ASIC (application specific integrated circuit). The processor can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them.

Furthermore, certain aspects of the concepts disclosed herein can take the form of a computer program product accessible from a computer-usable or computer-readable medium providing program code for use by or in connection with a computer or any instruction execution system. The phrase computer-readable medium or computer-readable storage medium is intended to include non-transitory storage mediums.

The systems and concepts disclosed herein can be applied in any one of a variety of different industries and be utilized in conjunction with virtually any kind of RBAC system.

Other implementations are within the scope of the claims.

What is claimed is:

1. A computer-based method, comprising the steps of:

extracting from a computer-based system, information identifying a plurality of users and information identifying one or more profiles for each respective one of the users, wherein each profile corresponds to one or more assigned authorizations;

creating one computer-based user bloom filter for each one of the users, wherein each user bloom filter correlates an associated one of the users to one or more of the profiles;

creating one computer-based profile bloom filter for each one of the profiles, wherein each profile bloom filter correlates an associated one of the profiles to one or more of the assigned authorizations;

creating one action bloom filter for each of a plurality of end user queries, wherein each action bloom filter correlates an associated one of the end user queries to a set of users that authorized to perform the action associated with the corresponding end user query; and identifying a segregation of duties (SoD) conflict among the plurality of users.

2. The method of claim 1, wherein identifying a segregation of duties (SoD) conflict among the plurality of users comprises:

identifying a first bloom filter from among the user bloom filters, the profile bloom filters and the action bloom filters;

identifying a second bloom filter from among the user bloom filters, the profile bloom filters and the action bloom filters; and identifying an intersection between the first bloom filter and the second bloom filter.

3. The method of claim 2, wherein each of the first bloom filter and the second bloom filter is represented by a sequence of bits, and wherein identifying the intersection between the first bloom filter and the second bloom filter comprises:

applying a logical AND function to the sequence of bits associated with the first bloom filter and the second bloom filter.

4. The method of claim 2, further comprising:

creating an intersection bloom filter based on the intersection between the first bloom filter and the second bloom filter.

5. The method of claim 4, further comprising:

enabling an end-user to query for SoD conflicts from a computer-based end-user terminal; and using the intersection bloom filter, in response to the query, to identify any SoD conflicts.

6. The method of claim 5, further comprising:

presenting, at the computer-based end-user terminal, information responsive to the query from the end-user.

7. A computer-based method, comprising the steps of:

extracting from a computer-based system, information identifying a plurality of users and information identifying one or more profiles for each respective one of the users, wherein each profile corresponds to one or more assigned authorizations:

creating one computer-based user bloom filter for each one of the users, wherein each user bloom filter correlates an associated one of the users to one or more of the profiles;

creating one computer-based profile bloom filter for each one of the profiles, wherein each profile bloom filter correlates an, associated one of the profiles to one or more of the assigned authorization; and creating one action bloom filter for each of a plurality of end user queries, wherein each action bloom filter correlates an associated one of the end user queries to a set of users that are authorized to perform the action associated with the corresponding end user query, wherein the computer-based system is a role based access control (RBAC) system.

8. A computer-based method, comprising the steps of:

initializing a query system for a computer-based, role-based access control (RBAC) system by:

extracting from the RBAC system information identifying a plurality of users and information identifying one or more profiles for each respective one of the users, wherein each profile corresponds to one or more assigned authorizations; and creating a plurality of different types of computer-based bloom filters based on the extracted information; and monitoring the computer-based RBAC system for changes and updating one or more of the bloom filters according to one or more changes to the computer-based RBAC system.

9. The computer-based method of claim 8, wherein the initializing step is performed only once for the RBAC system, whereas the monitoring step is performed on an on-going basis while the query system is in operation.

10. The computer-based method of claim 8. further comprising:

enabling an end user to query about the computer-based, role-based access control (RBAC) system from a computer-based end-user terminal;

using a corresponding one or more of the bloom filters to identify information responsive to the end-user query; and presenting the identified information at the computer-based end-user terminal.

11. A system comprising:

a computer-based processor; and a computer-based memory that stores instructions executable by the processor to perform the steps comprising:

extracting from a computer-based, role-based access control (RBAC) system information identifying a plurality of users and information identifying one or more profiles for each respective one of the users, wherein each profile corresponds to one or more assigned authorizations;

creating one computer-based user bloom filter for each one of the users, wherein each user bloom filter correlates an associated one of the users to one or more of the assigned profiles;

creating one computer-based profile bloom filter for each one of the profiles, wherein each profile bloom filter correlates an associated one of the profiles to one or more of the contained authorizations; and creating one action bloom filter for each of a plurality of end user queries, wherein each action bloom filter correlates an associated one of the end user queries to a set of users that are authorized to perform the action associated with the corresponding end user query.

12. A system comprising:

a computer-based processor; and a computer-based memory that stores instructions executable by the processor to perform the steps comprising:

initializing a query system for a computer-based, role-based access control (RBAC) system by:

extracting from the RBAC system information identifying a plurality of users and information identifying one or more profiles for each respective one of the users, wherein each profile corresponds to one or more assigned authorizations; and creating a plurality of different types of computer-based bloom filters based on the extracted information; and monitoring the computer-based RBAC system for changes and updating one or more of the bloom filters according to one or more changes to the computer-based RBAC system.

13. A non-transitory, computer-readable medium that stores instructions executable by a processor to perform the steps comprising:

extracting from a computer-based, role-based access control (RBAC) system information identifying a plurality of users and information identifying one or more profiles for each respective one of the users, wherein each profile corresponds to one or more assigned authorizations;

creating one computer-based user bloom filter for each one of the users, wherein each user bloom filter correlates an associated one of the users to one or more of the assigned profiles;

creating one computer-based profile bloom filter for each one of the profiles, wherein each profile bloom filter correlates an associated one of the profiles to one or more of the contained authorizations; and creating one action bloom filter for each of a plurality of end user queries, wherein each action bloom filter correlates an associated one of the end user queries to a set of users that are authorized to perform the action associated with the corresponding end user query.

14. A non-transitory, computer-readable medium that stores instructions executable by a processor to perform the steps comprising:

initializing a query system for a computer-based, role-based access control (RBAC) system by:

extracting from the RBAC system information identifying a plurality of users and information identifying one or more profiles for each respective one of the users, wherein each profile corresponds to one or more assigned authorizations; and creating a plurality of different types of computer-based bloom filters based on the extracted information; and monitoring the computer-based RBAC system for changes and updating one or more of the bloom filters according to one or more changes to the computer-based RBAC system.

* * * * *